Patented Nov. 24, 1931

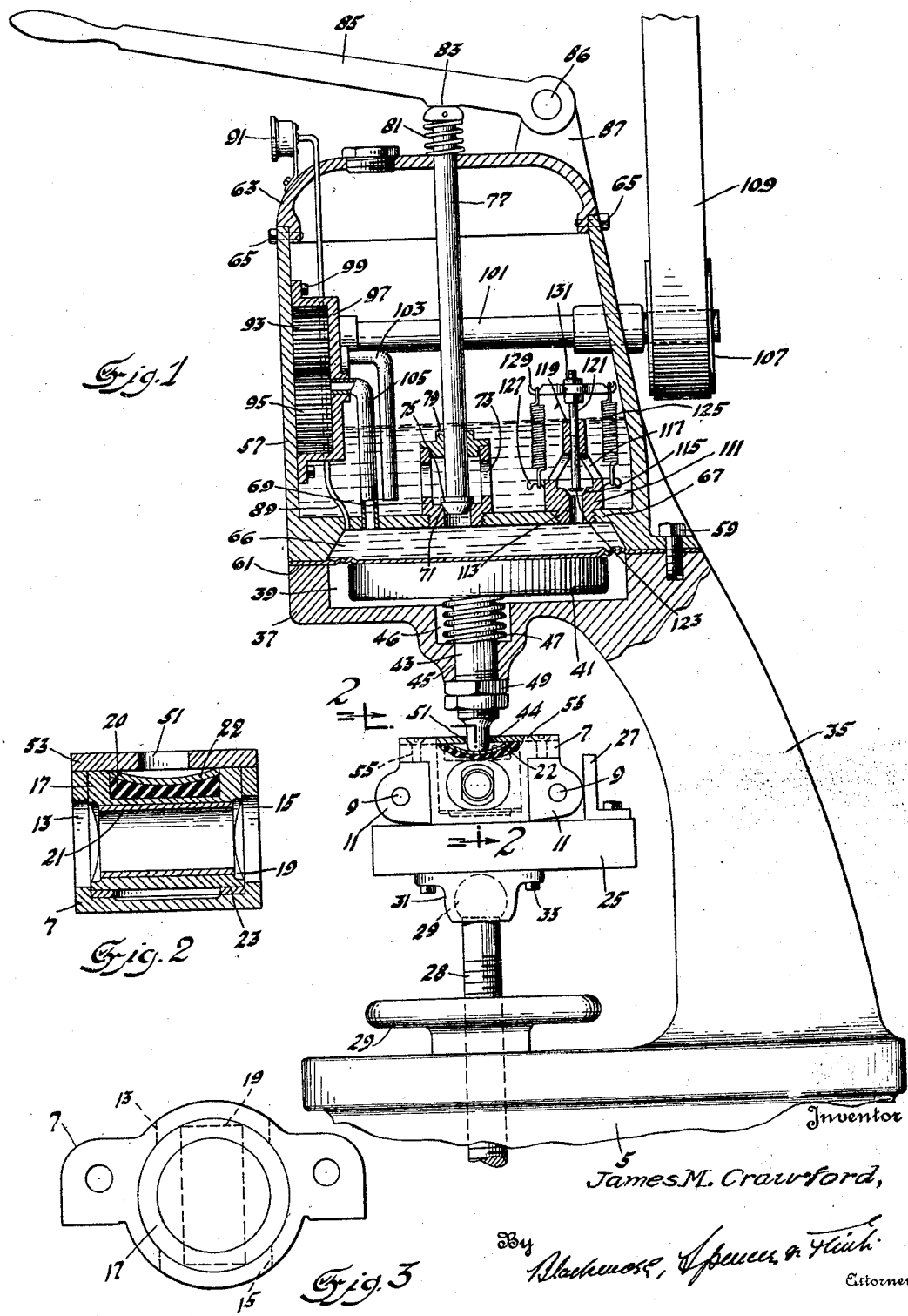

1,833,415

UNITED STATES PATENT OFFICE

JAMES M. CRAWFORD, OF DETROIT, MICHIGAN, ASSIGNOR TO GENERAL MOTORS CORPORATION, OF DETROIT, MICHIGAN, A CORPORATION OF DELAWARE

METHOD OF SUPPLEMENTING THE FRICTIONAL RESISTANCE OF RELATIVELY MOVABLE MEMBERS

Application filed July 2, 1928. Serial No. 289,967.

This invention relates to a centralizer for brakes, and more particularly to a process for providing a predetermined resistance to the relative movements of the parts of such a centralizer. The invention, while designed especially for the purpose stated, will be found useful in other relations.

An object of the invention is to provide a process for producing an article having movable parts, the relative movement of which is to be frictionally resisted by a predetermined force. As a further object, the process secures the predetermined resistance to relative movement of the parts of the article by giving to a resilient means associated with said parts a predetermined degree of resiliency. As a further object, the process insures uniformity in the case of a plurality of articles, each having a predetermined resistance between their relatively movable parts.

Other objects and advantages will be obvious from a reading of the following description and an examination of the accompanying drawings.

In the drawings:

Figure 1 illustrates an apparatus partly in elevation and partly in section whereby the process may be carried out.

Figure 2 is a section of the completed article, the section being on line 2—2 of Figure 1.

Figure 3 is a top plan view of the article with the cover plate removed.

Referring by reference characters to the several figures, numeral 5 represents the base of the apparatus designed to secure by its operation uniform pressures in rubber blocks, used in connection with centralizing devices for vehicle brakes. In such brakes, a box or the like 7 has openings 9 in flanges 11 whereby it may be clamped to the fixed or backing plate of a brake. This box has aligned openings 13 and 15, one of which is on that side adjacent the flanges 11 and the other on the opposite side. Within the box is a cylindrical member 17 which, as clearly shown in Figure 3, is rotatable within the box. The member 17 is transversely apertured as at 19 and provided with a bushing 21 to rotatably journal a shaft, such, for example, as the cam carrying shaft of a vehicle brake. It will be understood, of course, that the cam on this shaft is to be located within the brake drum and engage the ends of the brake band or the brake shoes. It will be seen, too, that the openings 13 and 15 are sufficiently large to accommodate the rotary movement of the member 17 carrying the projecting camshaft. Beneath member 17 is a bearing ring 23 between the fixed box and the rotatable member 17. On the opposite side, the member 17 is recessed and in the recess is located means to frictionally engage with the adjacent face of the box and resist too free rotary movement of the part 17. It will be understood that in the action of the brake it is desirable that the camshaft shall be not only rotatable on its axis, as in bushing 21, to rock the cam, but that the cam may have a limited circumferential movement in the drum. It is to give that movement that part 17 is mounted rotatably in box 7. It is to resist too free movement of member 17 in the box that the resisting means is located in the recess of member 17.

The means to control the movement of member 17 relative to box 7 in the case of the several brakes should be equally effective to secure uniform brake action. It is, therefore, proposed to use a block of rubber 20, or the like, in the recess of member 17 and to interpose a disc of metal 22 upon the rubber to engage the walls of the box, the rubber to exert uniform pressure on the disc. The purpose of the apparatus herein disclosed is to deform the disc 22 and the rubber block 20 to such an extent that, in the case of a plurality of such articles, there may be the same resiliency imparted to the rubber block 20 and, in consequence, the same resistance offered to the relative movement of member 17 in the case of each such article. By this provision, it is not necessary to exercise exceeding care to secure for each centralizer unit rubber having the same resilient quality, nor to secure blocks of rubber having the same dimensions. It is only necessary to give to each a predetermined pressure neglecting exceedingly great refinement as to uniformity in resilient characteristics or dimensions.

Upon base 5 is mounted a work support 25 upon which is suitably carried a centralizer assembly, as shown in the drawing. Any suitable means (parts 27 being illustrative merely) to hold the work on support 25 may be used. The support 25 is adjustable by means of a threaded rod 28 positioned by an adjustable member 29. The upper end of rod 28 has a ball 29 located within a socket 31 secured to the under side of support 25 by fastening means 33.

The base 5 has an arm 35 arched upwardly over the work support. The top 37 of the arm is recessed as at 39 to receive therein a circular disc 41. This disc carries a plunger 43 operable through an opening 45 in the lower part of the top portion 37. Between the recess 39 and the opening 45 is a pocket 46 housing a coil spring 47 seated in the pocket and engaging the disc 41 exerting upward pressure on said disc. To limit the upward movement of the disc under the influence of spring 47, the plunger 43 carries adjusting nuts 49 engaging the top member 37. The plunger terminates in a rounded end 44, which may enter an opening 51 in the top 53 of the box 7. This top is removably associated with the box for the purpose of assembly and is held in position by fastening means 55.

Secured to the top 37 of the base casting is a housing 57, there being fastening bolts 59. Clamped between the top 37 and the flanges of the housing and held by bolts 59 is a diaphragm 61. This diaphragm is engaged by disc 41, as shown. The housing is to carry the operating means by which a predetermined pressure is given the rubber blocks of the centralizer. The housing is covered by a closure member 63 secured by fastening means 65.

Housing 57 is recessed in its bottom portion, as at 66, said recess being bounded by a wall 67 and by the diaphragm 61. The wall 67 carries a valve cage 69 fitted into an opening in an intermediate part thereof. The valve cage has a seat 71 and lateral openings 73, whereby there may be a passage between recess 66 and the chamber within the housing 57. The communication may be closed by valve 75 carried by stem 77 guided by the top 79 of the cage and by the cover member 63, as shown in the drawings. A spring 81 surrounds the stem 77 outside the cover and is in abutment with the cover and with a lug 83 or a lever 85 pivoted at 86 to a lug 87 on the cover 63. The spring tends to raise the stem and the valve 75 and open the communication between the recess 66 and the chamber of the housing 57. This spring may be overcome by manual pressure applied to the end of the lever whereby the valve may be closed. A conduit 89 extends from the recess 66 up through the housing and cover to a gage 91 which serves to indicate the pressure condition within the recess 66.

For circulating the fluid, a pump is used within the housing. This pump may be conveniently arranged by providing a pair of gears 93 and 95 within a casing 97 attached by fastening means 99 to the wall of the housing. A shaft 101 is journalled in the casing 97 and in a remote wall of the housing. This shaft may carry gear 93 and gear 95 may be driven by gear 93. Two conduits 103 and 105 extend from the casing to the housing chamber and to the recess respectively. Conduit 103 serves as an inlet for the pump and conduit 105 as an outlet. The action of the pump is to draw fluid from the housing chamber and discharge it into the recess. When the valve 75 is open, the fluid returns through the cage openings. When the valve 75 is closed, the pressure is delivered to the fluid within recess 66 and the diaphragm and disc 41 descend and the plunger 43 exerts pressure on disc 22.

The shaft 101 may be driven in any preferred manner. There is shown a pulley 107 carried by shaft 101 and a belt 109 for driving the pulley.

To predetermine the maximum pressure to be applied to the plunger, a relief valve may be used. Such a valve is shown in Figure 1 in the base 67 of the housing. A plug 111 is inserted in the base. It has an opening 113 and valve seat 115. The plug has lateral openings 117 and an integral valve stem guide 119 for a valve stem 121. The valve 123 carried by the stem engages the valve seat under the influence of springs 125. These springs have their ends connected respectively to arms 127 projecting from the plug and to the ends of the cross-head 129 held by nuts 131 or the equivalent on the valve stem. The springs serve, by their tension, to hold the valve seated. The tension of the springs is overcome when a predetermined pressure is applied by the pump within the recess 66 and the fluid is thereafter circulated, even though the manually operated valve 75 remains closed.

In operation, the parts of the centralizer are assembled, and the assembly is placed on the support 25. In so assembling the parts, blocks of rubber may be used which are not all alike in dimensions or characteristics. The lever is pulled down to close valve 75 whereupon the pumped fluid enters recess 66 and depresses the plunger. The end of the plunger 43 engages the disc, bends it substantially to the shape shown in Figure 2, and the rubber is deformed and exerts a force through the margin of the disc and upon the box cover. The operator may watch the gage, and when a predetermined pressure is reached he may relieve the pressure. Should he fail to so relieve the pressure and if the apparatus is supplied with the relief valve shown in the drawings, this valve will automatically permit fluid circulation and stop the plunger at a predetermined point in its downward movement. The movement of the plunger permanently bends the plate 22 and deforms the rubber, the elasticity of the latter thereupon makes of it a resilient member exerting pressure between the member 17 and the box 7, which pressure resiliently resists the rotary movement of member 17 within the box.

I claim:

1. The method of supplementing the frictional resistance to the relative movement of two members consisting in assembling said members for relative movement, positioning between said members an elastic deformable mass and a relatively inelastic deformable element, forcibly and permanently deforming the latter element, and through the deformation of the latter deforming the elastic means, whereby its elasticity is effective to cause frictional resistance to the relative movement of said members.

2. The method set forth in claim 1, the deforming force being applied substantially centrally of said deformable element and said element peripherally applying the resiliency of said elastic mass to one of said members to thereby cause frictional resistance to the relative movement of said members.

3. The method of rendering active a non-metallic deformable elastic mass consisting in permanently housing said non-metallic deformable elastic mass, assembling therewith a deformable relatively inelastic element and permanently and simultaneously deforming said element and mass whereby said mass may exert its elasticity through the instrumentality of said element upon said permanent housing.

4. The method of applying a braking force to resist the relative movement of two frictionally engaging members comprising assembling said members for relative movement, assembling with a first one of said members a non-metallic deformable elastic mass, and in contact therewith and for engagement with a second one of said members a deformable inelastic element and thereafter simultaneously deforming said element and mass under the influence of a predetermined pressure.

In testimony whereof I affix my signature.

JAMES M. CRAWFORD.